Figure 1:
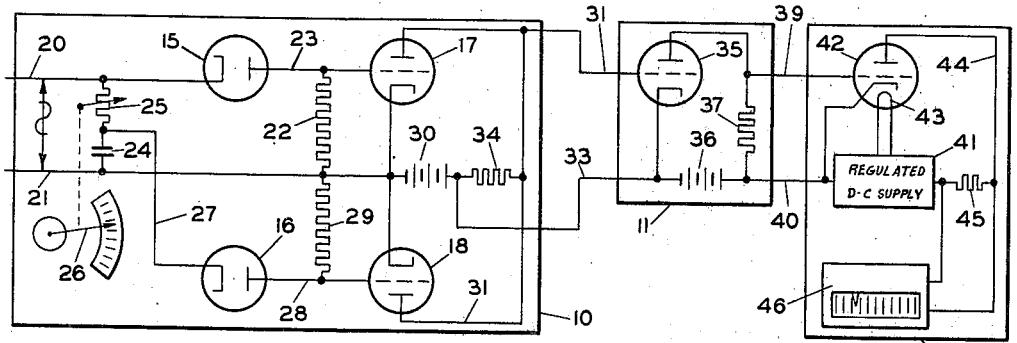

Jan. 3, 1950  G. M. THYNELL  2,493,508
TELEMETRIC APPARATUS
Filed July 18, 1944

INVENTOR.
Gustave M. Thynell
BY E. C. Sanborn
Attorney

Patented Jan. 3, 1950

2,493,508

UNITED STATES PATENT OFFICE 2,493,508

TELEMETRIC APPARATUS

Gustave M. Thynell, Naugatuck, Conn., assignor to The Bristol Company, Waterbury, Conn., a corporation of Connecticut Application July 18, 1944, Serial No. 545,501

1 Claim. (Cl. 177—351)

This invention relates to telemetering systems, and more especially to a telemetering system of the "impulse-duration" class in which the transmitted signal takes the nature of a series of cyclically transmitted impulses in each of which the amplitude may be any value above a certain minimum and the duration is a function of the magnitude of the measured variable. Telemetering systems of this general class are well konwn, and are exemplified in U. S. Letters Patent No. 1,822,683, granted September 8, 1931, to K. Wilde, and reissued as No. 19,039, January 2, 1934, and also in U. S. Letters Patent No. 1,954,850, granted April 7, 1934, to C. H. Smoot, and reissued as No. 20,695, April 12, 1938. In each of these patents and reissues a continuously operating mechanical transmitting device, in cooperation with an index or pointer deflecting with variations in a measured magnitude, serves to impress upon an electrical circuit a series of cyclically recurring impulses of the nature hereinbefore set forth, while a suitable mechanical receiving instrument responds to said impulses in a sense to translate them into a useful exhibition of the magnitude measured at the transmitting device. It will be obvious that in telemetering systems of the type shown in said disclosures the frequency of impulses will be subject to mechanical limitations, with a corresponding possible lack of fidelity in the remote measurement of rapidly varying magnitudes. In actual practice, it has been found that the limiting values of the frequency with which impulse-duration telemetering systems of the mechanical type can transmit signals of significant value and provide a dependable measure of these in the receiving instrument is of the order of one per second; and accurate duplication of measurement, even at this rate, is attended with mechanical difficulties, and in general is adapted to operation only under laboratory conditions.

It is an object of the present invention to provide a telemetering system of the impulse-duration class, in which the frequency of the recurrent signals whose respective durations represent the corresponding momentary values of the measured variable, instead of being of the order of a possible maximum of one per second, shall be that of a commercial alternating-current supply, e. g. 60 impulses per second.

It is a further object to provide a telemetering system of the above class in which the development and definition of successive impulses of varying durations shall be effected without the use of motors or other continuously rotating parts, and in fact without any moving part in the transmitting instrument excepting that which deflects in response to variations in the value of the measured variable.

It is a further object to provide a measuring system adapted to develop signals suited for direct measurement, or for transmission to a remote point for measurement, and of durations representative of the phase angle between two alternating-current magnitudes of identical frequency.

In effecting the purposes of the invention, it is proposed to provide means whereby successive half-waves of an alternating voltage are independently rectified, separated into two groups, the phase position of those constituting one of said groups shifted with respect to that of those in the other in correspondence with variations in the magnitude of a measured variable, said half-waves then being converted from a sinusoidal to a "square" characteristic, and the two groups superposed in a common circuit to produce successive impulses of the frequency of the original source and of limited amplitude, each abruptly initiated and terminated, and the time lapse between the initiation and termination of each impulse being a function of the then magnitude of the measured variable. For purposes of clarity in discussing the principles of the invention, and without necessarily so restricting the definitions, the term "pulse" is used in the specification and in the claim to designate a rectified wave portion, e. g., a half-wave, differing in no essential of wave shape from the corresponding part of the original wave, while the term "impulse" is applied to a cyclical wave or signal being substantially instantaneously initiated and terminated, or more nearly approaching a "square form" than the original wave.

In the drawings:

Fig. 1 is a diagrammatic representation of an electronic system embodying the principles of the invention.

Figure 2:
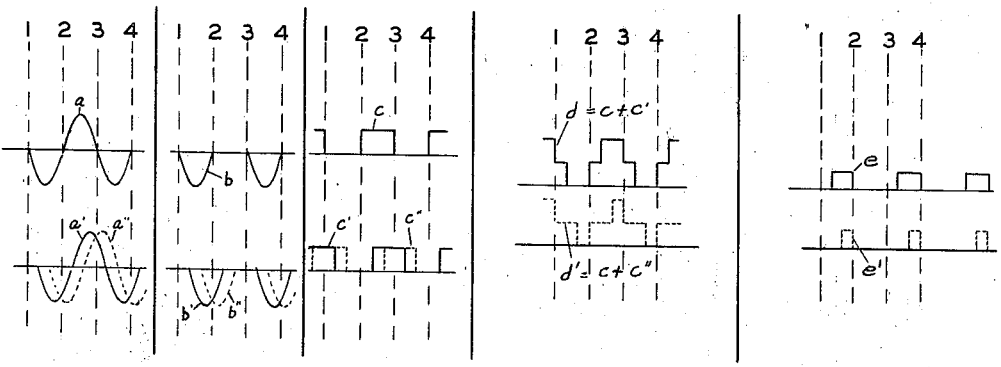

Fig. 2 provides graphical representations of certain electrical magnitudes existing in the circuits shown in Fig. 1.

Figures 3, 4:
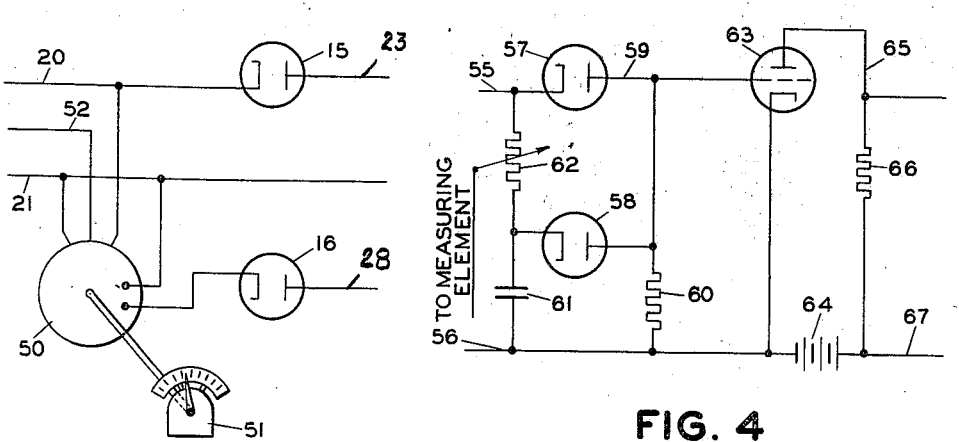

Fig. 3 is an alternative form of transmitting unit adapted to use with the circuits embodying the principles of the invention.

Fig. 4 indicates an alternative combination of certain electron tube elements included in the transmitting circuit.

Referring now to the drawings: The system shown in Fig. 1 comprises three more or less distinct elements, a transmitting unit 10, a relay unit 11, and a receiving unit 12, together with suitable interconnecting circuits. The transmitting unit 11 combines a pair of diodes 15 and 16 adapted to the purposes of rectification of an alternating current and a pair of triodes 17 and 18, each having a cathode, an anode, and an interposed grid element. It is the purpose of the triodes 17 and 18 to function as relays, actuated in accordance with changes in grid potential, to produce cyclically recurring unidirectional pulses of plate current. These triodes are so selected and operated that a relatively small negative input voltage will abruptly cut off the flow of plate current. While, for purposes of clarity, the several electron tubes are shown in the diagram as separate units, there are available various combinations wherein elements having the functions of two or more tubes may be incorporated in a common envelope. For example those of the two rectifying tubes 15 and 16 may be combined in a single unit of the type commercially known as "6H6," while the characteristics of the "6N7" tube are well suited to the purposes combined in the triodes 17 and 18.

A supply of alternating potential is provided by a pair of conductors 20 and 21, the former being directly connected to the cathode of the rectifier tube 15. A suitable resistor 22 is connected between the conductor 21 and a conductor 23, which in turn is connected to the anode of the tube 15. Between the conductors 20 and 21 are connected in series a capacitor 24 and a variable resistor 25, the latter being mechanically attached to a measuring element 26 adapted to deflect in correspondence with changes in the magnitude of a measured variable. Between the capacitor 24 and the resistor 25 is tapped a conductor 27 directly connected to the cathode of the tube 16, whose anode is connected by a conductor 28 in series with a suitable resistor 29 to the conductor 21. The combination of the capacitor 24 and the resistor 25 provides means whereby, according to well-known principles, the alternating potential between conductors 27 and 21 may be varied in phase with respect to the supply potential existing between the conductors 20 and 21.

The cathodes of tubes 17 and 18 are connected to the conductor 21, and also to the negative terminal of a battery 30 or other suitable source of unidirectional electrical potential. The anodes of said tubes are connected to common conductor 31, and also in series with a suitable resistor 34 to the positive terminal of the battery 30, and a conductor 33 is tapped between said resistor and battery.

The relay element 11 comprises a triode 35 having a cathode, and anode, and an interposed grid, said triode being so selected and operated that a relatively small negative input voltage will abruptly cut off the plate current. The cathode of the tube 35 is connected by means of the conductor 33 to the negative terminal of a suitable battery 36 and also to the positive terminal of the battery 30. The anode or plate of the triode 35 is connected in series with a suitable resistor 37 to the positive terminal of the battery 36, and the grid of said triode to the conductor 31, and thence to the plates of triodes 17 and 18. Conductors 39 and 40 connected to the terminals of the resistor 37 provide a circuit for transmission to the receiving unit 12 of impulses representing the potential developed between said resistor terminals due to the flow of current therethrough, the nature of which impulses will presently be described.

The operation of the apparatus as thus far set forth is as follows:

With an alternating potential applied between the conductors 20 and 21, the rectifier tubes 15 and 16 will cause to flow through each of the resistors 22 and 29 pulses of an alternating current having half-wave rectification; and, because of the phase-shifting combination included in the cathode circuit of the tube 16, the pulses of current in the resistor 29 will be out of phase with those in the resistor 22. The phase relations of alternating electrical magnitudes in the system will be better understood by reference to Fig. 2, in which the various wave representations are shown with reference to a common set of time ordinates 1, 2, 3, and 4, in the several divisions of the diagram.

The sinusoidal wave $a$ represents the potential applied between the conductors 20 and 21, and also the voltage applied to the rectifier tube 15. The potential existing between the conductors 27 and 21 is indicated at $a'$ and $a''$, corresponding to two possible phase positions, according to the magnitude of the resistor 25, as varied by the deflection of the measuring instrument 26. Corresponding to the potentials applied to the rectifying tubes, the group of pulses $b$ and the group $b'$ and $b''$ represent the currents flowing in the resistors 22 and 29 respectively. Concomitant with the flow of pulses of current through the resistors 22 and 29, potentials of corresponding wave form will be applied between the grids and the cathodes of the tubes 17 and 18; and, as these tubes are operated in a manner to cut off plate current abruptly upon the application of a relatively low value of negative grid voltage, the plate currents will take the nature of "square" waves of amplitude limited by the resistance of the circuit in proportion to the voltage of the battery 30, and of durations corresponding to the intervals between the pulses of applied grid voltage. Thus, the plate current of the tube 17 will take the form of a succession of impulses of fixed amplitude and phase position with respect to the supply voltage, as indicated at $c$ in Fig. 2, while that of the tube 18 will be in the form of impulses of fixed amplitude and duration, but of variable phase position, as indicated at $c'$ and $c''$, the phase position being, of course, directly dependent upon that of the corresponding negative pulses $b'$ and $b''$ of potential applied to the grid of the tube 18.

Since the resistor 34 forms a common return circuit for the plate currents of the tubes 17 and 18 flowing in the conductors 31 and 32 respectively, it follows that there will be developed across said resistor a difference of potential corresponding to the sum of these currents, which voltage will be as represented at $d$ in Fig. 2, this being the resultant two groups of impulses $c$ and $c'$. Similarly, the wave shown at $d'$ in Fig. 2 represents the resultant of $c$ and $c''$. The "stepped" wave $d$ and $d'$ represents the potential difference existing between the conductors 31 and 33; and these conductors may be made to function as a transmitting channel in which case the impulses $d$ and $d'$ constitute the signal conveyed from the transmitting to the receiving instrument.

The relay element 11, which may be directly associated with either the transmitting or the receiving instrument, performs the function of reducing the stepped waves to impulses of a fixed amplitude. The triode 35 being operated in a manner to cut off plate current abruptly when the grid voltage exceeds a relatively small value, will become non-conductive during those intervals of time represented by voltage impulse $d$ or $d'$, and will allow current to pass in its plate circuit during those intervals when no grid voltage is present. The amplitude of the plate current impulse will be governed solely by the resistance of the plate circuit, including the resistor 37, in relation to the voltage of the battery 36, and the durations of said impulses will be directly representative of the gaps existing between the impulses $d$ or $d'$ characterizing the grid voltage. This current, flowing through resistor 37, will cause to appear between the conductors 39 and 40 a potential in the form of a series of cyclical impulses as represented at $e$ or $e'$ in Fig. 2, said impulses having fixed amplitude and their durations being a definite function of the magnitude represented by the deflected position of the measuring element 26 in the transmitting instrument. If the relay element 11 be directly associated with the transmitting unit 10, the conductors 39 and 40 become the transmitting circuit, and the voltages transmitted thereby fulfill all the requirements of a telemetering system of the impulse-duration class. By relay means well known in the art of telemetering, and forming no part of the present invention, the voltage impulses appearing between the conductors 39 and 40 may be superimposed on a carrier current system, or otherwise utilized as a means of "keying" signals in any one of a large variety of accepted forms of communication channels. Examples of such channels will be found in the "Report on Telemetering, Supervisory Control and Associated Circuits," published by the American Institute of Electrical Engineers, October 1941.

Since it will be obvious that receiving instruments of the type having clutches or equivalent mechanical devices of an intermittently engaging nature, will be unsuited to use in conjunction with a system where the successive impulses are applied with a frequency corresponding to that of a commercial alternating current, it follows that special means will be necessary in order to obtain a mechanical deflection or other useful exhibition representing in magnitude the quantity which is being measured and transmitted. The receiving unit 12 represents one manner in which this desired result may be obtained. A source 41 of regulated unidirectional voltage serves as a source of supply for a thermionic tube 42 having a cathode, and anode or plate, and an interposed grid element. The tube 42 is provided also with a filament 43, preferably adapted to receive current from the regulated supply 41, or some equivalent source, so that the output of the tube 42 will not be subject to such variations in amplitude as would result from fluctuations in the value of filament current or plate voltage. The negative terminal of the regulated supply 41 is connected to the cathode of the tube 42 and also to the conductor 40. The anode or plate of the tube 42 is connected by means of a conductor 44 in series with a suitable resistor 45 to the positive terminal of the regulated supply 41 and the grid to the conductor 39. A direct current millivoltmeter 46 which may be of the indicating or the recording type, and may take the form of a self-balancing potentiometer, is connected across the terminals of the resistor 45, whereby to provide a measure of the average unidirectional potential existing between said terminals. Since the amplitude of the impulses of measured potential is maintained constant by regulation of the operating voltages of the tube 42, it follows that the instrument 46 will vary its readings in response only to changes in the ratio of the time represented by the sum of the intervals during which impulses are impressed upon its terminals to the total elapsed time, and that its readings will be a function of the duration of said impulses, and hence of the magnitude measured by the instrument 26 in the transmitting unit.

It will be seen that, since the durations of the impulses $e$, $e'$, etc. transmitted through the circuit represented by the conductors 39—40, and impressed upon the terminals of the receiving unit, may vary from zero to the time of a half-cycle of the system frequency, and that as each of these impulses, applied to the grid of the triode 42 in the receiving unit, will act to cut off the flow of plate current, the impulses of current flowing in the conductor 44, and measured by the instrument 46, may vary from a minimum of a half-cycle to a maximum of total elapsed time, or continuous current. If circuit conditions be such that the impulses between the conductors 31—33 are of sufficient power without amplification to actuate the receiving unit 12, the relay unit 11 may be omitted and the instrument 46 calibrated to a range corresponding to impulse durations varying from zero to a half-cycle, similar to those indicated at $e$ and $e'$ in Fig. 2. In general, it may be stated that either of the two ranges of impulse durations may be utilized and may be selectively obtained according to the number of stages of amplification in the system. It will further be obvious that, since the reading of the instrument 46 is dependent solely upon the durations of discrete impulses with respect to total elapsed time, the total number of such impulses within said time, i. e., the frequency of the system, will have no effect upon the measurement.

In Fig. 3 is shown an alternative means of varying the relative phase position of the pulses of current in the output circuits of the rectifying tubes in the transmitting unit. The line conductors 20 and 21, and the rectifying tubes 15 and 16 are identical with those indicated in Fig. 1. The anodes of said tubes are connected to conductors 23 and 28, and all remaining connections are identical to those shown in Fig. 1. Instead of the phase-shifting network comprising the resistor 25 and the capacitor 24 as in Fig. 1, use is made of a phase-shifting device 50, which may be of either the inductive type or the capacitative type, having a rotor mechanically connected to the deflecting member of a measuring instrument 51, the readings of which it is desired to transmit. The output terminals of the phase-shifter 50 are connected between the conductor 21 and the cathode of the rectifying tube 16 as indicated, and the input terminals to a suitable source of alternating excitation. As shown in the drawing, it is assumed that the conductors 20 and 21 provide one phase of a three-phase system, in which case said conductors, together with a third conductor 52, completing the three-phase supply are connected to a suitable input circuit in the phase-shifter 50, providing a rotating field, from which the rotor, as positioned by the moving element of the instrument 51 derives excitation, and thereby develops an induced alternating potential of substantially constant amplitude, and of a phase position representative of the indication of the measuring instrument 51.

Apparatus adapted to the purposes of the device 50 is well known in the art of electrical measurement; and descriptions of phase shifting transformers which may be made to have suitable properties will be found by reference to the following textbooks:

Commercial A-C Measurements: Stubbins (Van Nostrand, 1930), page 288.

Electric Power Metering: Knowlton (McGraw-Hill, 1934), page 161.

Radio Engineers Handbook: Terman (McGraw-Hill, 1943), page 949.

These devices require polyphase excitation, and may be designed either for direct connection to a polyphase system, or, by means of a suitable "phase-splitter" to a single-phase supply. They are commercially available in small sizes of low mechanical and electrical power requirement, adapted to direct connection to the moving elements of many forms of measuring instruments. The last of the above three references describes also a phase-shifter operating on the electrostatic principle and readily adaptable to the purposes of the invention.

Fig. 4 is a diagrammatic representation of a simplified form of transmitting circuit enabling the omission of one of the two triodes associated with the form shown in Fig. 1. In conjunction with an alternating current supply represented by two conductors 55 and 56, two rectifying tubes 57 and 58 are employed, the tube 57 having its cathode connected to the conductor 55 and its anode to a conductor 59, and thence, in series with a suitable resistor 60 to the conductor 56. A phase-shifting network comprising a capacitor 61 and an adjustable resistor 62 adapted to be varied by mechanical operation from a measuring element not shown, is also connected between the conductors 55 and 56. The cathode of the rectifying tube 58 is connected to a point between the capacitor 61 and the resistor 62, and the anode of said tube to the conductor 59. A suitable triode or equivalent vacuum tube 63 has its cathode connected to the conductor 56 and also to the negative terminal of a battery 64. The anode of the tube 63 is connected to a conductor 65, and thereby, in series with a suitable resistor 66 and a conductor 67 to the positive terminal of the battery 64; and the grid of said tube is connected to the conductor 59.

The operation of the circuit shown in Fig. 4 is similar to that hereinbeforedescribed, with exception of the fact that the alternating pulses emanating from the rectifying tubes 57 and 58, and corresponding to the half waves b and b' or b'' as shown in Fig. 2 are combined in the resistor 60, so that there is applied to the grid of the tube 63 a potential representing the resultant of said combined pulses. Since, by proper selection and operation of the tube 63, it may be caused to permit or inhibit the flow of current in the conductor 65 and the resistor 66 in response only to the termination and the initiation respectively of the applied grid voltage, and substantially independent of the wave form of said voltage, it follows that the current flowing in the resistor 66 will take the form of a series of cyclical impulses of durations governed by the relative phase positions of the outputs of the rectifying tubes 57 and 58, and therefore of the setting of the rheostat 62 in response to the deflected position of the measuring element. The potential between the conductors 65 and 67, being representative of the flow of current through the resistor 66 will take the form of a series of impulses suited to the purposes of a telemetering system of the class to which the invention is directed.

Since the form of the invention shown in Fig. 4 demands of the tube 63 the two functions of determining impulse durations and of maintaining their amplitudes within suitable operating limits, this method does not possess the flexibility and in some cases the precision, of that shown in Fig. 1, where said functions are distributed among several tubes subject to individual selection and coordination with circuit characteristics.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

In a telemetering system for transmitting measurements of the value of a variable magnitude, a first circuit including a rectifier supplied from a source of alternating voltage, a second circuit including a phase shifter and a rectifier supplied from said source, means for adjusting said phase shifter with changes in said magnitude, first and second electronic devices each having a cathode, an anode, and a control electrode, means for applying between the control electrode and the cathode of said first electronic device a potential representative of the current flowing in said first circuit, means for applying between the control electrode and the cathode of said second electronic device a potential representative of the current flowing in said second circuit, means to produce potentials representative of the combined currents flowing in the anodes of said electronic devices, and impulse-duration-responsive apparatus including an instrument adapted to provide a measure governed solely by time intervals between changes in said produced potentials.

GUSTAVE M. THYNELL.

REFERENCES CITED

The following references are of record in the file of this patent:

UNITED STATES PATENTS

| Number | Name | Date |
|---|---|---|
| 1,885,078 | Carter | Oct. 25, 1932 |
| 2,131,084 | Young | Sept. 27, 1938 |
| 2,256,482 | Isbister et al. | Sept. 23, 1941 |
| 2,256,487 | Mosely et al. | Sept. 23, 1941 |
| 2,287,174 | Heising | June 23, 1942 |